United States Patent
Ramappan et al.

(10) Patent No.: US 7,975,668 B2
(45) Date of Patent: Jul. 12, 2011

(54) SPARK TIMING AND CONTROL DURING TRANSITIONS BETWEEN SPARK IGNITED COMBUSTION AND HOMOGENOUS CHARGE COMPRESSION IGNITION

(75) Inventors: Vijay Ramappan, Novi, MI (US); Allen B. Rayl, Waterford, MI (US); Jun-Mo Kang, Ann Arbor, MI (US); Peter Kafarnik, Eltville-Erbach (DE); Matthew A. Wiles, Royal Oak, MI (US); Hanho Yun, Oakland Township, MI (US)

(73) Assignee: GM Global Technology Operations LLC

( * ) Notice: Subject to any disclaimer, the term of this patent is extended or adjusted under 35 U.S.C. 154(b) by 22 days.

(21) Appl. No.: 12/190,079

(22) Filed: Aug. 12, 2008

(65) Prior Publication Data

US 2009/0229562 A1    Sep. 17, 2009

Related U.S. Application Data

(60) Provisional application No. 61/035,593, filed on Mar. 11, 2008.

(51) Int. Cl.
*F02B 17/00* (2006.01)
*F02D 41/34* (2006.01)
*F02P 5/15* (2006.01)

(52) U.S. Cl. ..... 123/295; 701/103; 123/399; 123/406.45
(58) Field of Classification Search ............... 123/295, 123/349, 350, 406.11–406.14, 406.17, 406.19, 123/406.27, 406.72, 612, 399, 403, 406.45; 701/101–105

See application file for complete search history.

(56) References Cited

U.S. PATENT DOCUMENTS

| | | | | |
|---|---|---|---|---|
| 5,051,909 | A * | 9/1991 | Gomez et al. | 701/103 |
| 6,178,943 | B1 * | 1/2001 | Taga et al. | 123/295 |
| 6,769,403 | B2 * | 8/2004 | Rayl et al. | 123/406.23 |
| 2004/0084021 | A1 * | 5/2004 | Zhu et al. | 123/406.27 |
| 2008/0127933 | A1 * | 6/2008 | Blumberg et al. | 123/304 |

* cited by examiner

*Primary Examiner* — Willis R Wolfe, Jr.
*Assistant Examiner* — Johnny H Hoang

(57) ABSTRACT

A control system for an engine comprises an air per cylinder (APC) generating module that generates measured and desired APC values. A combustion transition module selectively transitions the engine from spark ignition (SI) combustion to homogeneous charge compression ignition (HCCI) combustion and from HCCI combustion to SI combustion. A spark control module selectively retards spark during the transitions based on a ratio of the measured APC value and the desired APC value. Alternately, spark retard can be based on measured and desired engine torque representing values (ETRVs).

12 Claims, 5 Drawing Sheets

SPARK TIMING AND CONTROL DURING TRANSITIONS BETWEEN SPARK IGNITED COMBUSTION AND HOMOGENOUS CHARGE COMPRESSION IGNITION

CROSS-REFERENCE TO RELATED APPLICATIONS

This application claims the benefit of U.S. Provisional Application No. 61/035,593, filed on Mar. 11, 2008. The disclosure of the above application is incorporated herein by reference in its entirety.

FIELD OF THE INVENTION

The present invention relates to engine control systems, and more particularly to engine control systems for engines operating in both spark ignition and homogenous charge compression ignition modes.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines may be operated in a spark ignition (SI) mode and a homogeneous charge compression ignition (HCCI) mode. The HCCI mode refers to compressing a mixture of fuel and an oxidizer to a point of auto-ignition. The HCCI and SI modes may be selected based on engine speed and load. In the HCCI mode, ignition occurs at several locations at a time, which makes a fuel/air mixture burn nearly simultaneously.

The HCCI mode performs close to an ideal OTTO cycle, provides improved operating efficiency (operates leaner and with lower pumping losses due less intake air throttling), and generates lower emission levels as compared to lean operation in spark ignition (SI) engines. However since there is no direct initiator of combustion, the ignition process may be more difficult to control.

To adjust operation during the HCCI mode, a control system may alter the conditions that induce combustion. For example, the control system may adjust effective compression ratios, induced gas temperature, induced gas pressure, or the quantity of retained or reinducted exhaust. Several approaches have been used to perform the adjustments and thus extend the HCCI operating region by providing finer control over temperature-pressure-time histories within a combustion chamber.

One control approach employs variable valve timing to adjust the effective compression ratio. For example, the compression ratio can be controlled by adjusting when intake valves open and close. The amount of exhaust gas retained in a combustion chamber can be controlled by valve re-opening and/or valve overlap.

Another approach is referred to as a "2-step" intake and exhaust valve lift approach, which includes switching intake and exhaust valve modes between a HIGH lift state and a LOW lift state. During the HIGH lift state, the intake and exhaust valves are lifted to a HIGH level to allow for an amount of air to enter the corresponding cylinders. During the LOW lift state, the valves are switched to a LOW level, which allows a smaller amount of air to enter the corresponding cylinders relative to the HIGH lift state.

The 2-step approach tends to have inconsistent and non-uniform transitions between SI and HCCI modes. In other words, there may be undesirable torque disturbances during the transitions.

SUMMARY

In some embodiments, a control system for an engine comprises an air per cylinder (APC) generating module that generates measured and desired APC values. A combustion transition module selectively transitions the engine from spark ignition (SI) combustion to homogeneous charge compression ignition (HCCI) combustion and from HCCI combustion to SI combustion. A spark control module selectively retards spark during the transitions based on a ratio of the measured APC value and the desired APC value.

In other features, ignition timing is retarded when measured APC value is greater than desired APC value.

In other features, a lift adjustment module employs a first intake and exhaust lift state during the HCCI combustion and a second intake and exhaust lift state during the SI combustion. When transitioning from the HCCI combustion to the SI combustion, the lift adjustment module switches to the second intake and exhaust lift state and then the spark control module retards the spark. A throttle control module controls a throttle of the engine to a demand-based throttle position. When transitioning from the SI combustion to the HCCI combustion, a throttle control module controls a throttle of the engine to a transition position, the spark control module retards the spark and the lift adjustment module switches to the first intake and exhaust lift state.

In some embodiments, a control system for an engine comprises an engine torque representing value (ETRV) generating module generates measured and desired ETRV values. A combustion transition module selectively transitions the engine from spark ignition (SI) combustion to homogeneous charge compression ignition (HCCI) combustion and from HCCI combustion to SI combustion. A spark control module selectively retards spark during the transitions based on a ratio of the measured ETRV value and the desired ETRV value.

In other features, the spark control module retards the spark when the measured ETRV value is greater than the desired ETRV value. A lift adjustment module employs a first intake and exhaust lift state during the HCCI combustion and a second intake and exhaust lift state during the SI combustion. When transitioning from the HCCI combustion to the SI combustion, the lift adjustment module switches to the second intake and exhaust lift state and the spark control module retards the spark.

The spark control module blends the spark during the transition to maintain desired torque until the spark can be returned to a mean best torque (MBT) value and further comprises a throttle control module that controls a throttle of the engine to a demand-based throttle position.

In other features, when transitioning from the SI combustion to the HCCI combustion, a throttle control module controls a throttle of the engine to a transition position, the spark control module retards the spark and the lift adjustment module switches to the first intake and exhaust lift state.

In other features, the measured and desired ETRV values comprise measured and desired net mean effective pressure (NMEP), respectively. The measured and desired ETRV values comprise measured and desired indicated mean effective pressure (IMEP), respectively.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein.

DETAILED DESCRIPTION

Figure 1A:
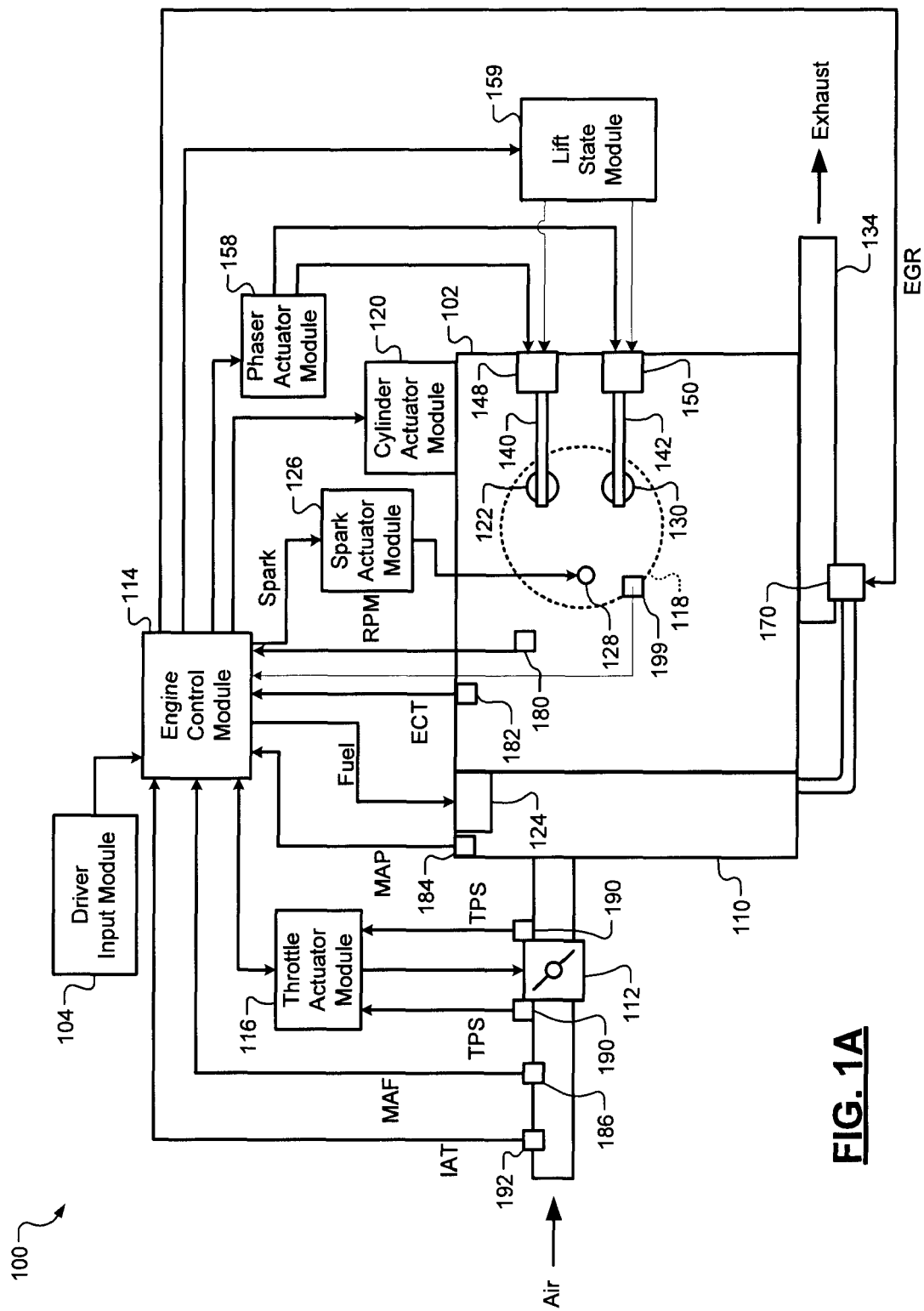
FIG. 1A is a functional block diagram of an engine control system that operates in SI and HCCI combustion modes according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The engine control system according to the present disclosure operates the engine in a spark ignition (SI) mode or a homogeneous charge compression ignition (HCCI) mode. The engine control system operates the engine in the HCCI mode at low to mid loads and low to mid engine speeds. The engine control system operates the engine in the SI mode at other (higher) loads and engine speeds. The HCCI operating zones may be defined by operating maps in calibration tables.

Depending upon driver requested torque, mode transitions between SI and HCCI and between HCCI and SI will be required. The mode transitions should minimize vehicle drivability degradation during the mode transitions. In addition, the impact on vehicle emissions should be minimized.

Mode transitions involve intake and exhaust valve lift changes. In other words, the engine control system switches from high lift to low lift profiles and vice versa. It may not be possible to completely eliminate cylinder air charge steps during valve lift changes. Therefore, the present disclosure seeks to minimize torque increases during periods of large instantaneous cylinder air charge changes.

Transient spark control may be used during operation in SI mode before and after transition into and out of HCCI operation. HCCI operation is nearly unthrottled (or at wide open throttle) and operated in the low lift state of the intake and exhaust valves. Therefore, the engine control system either increases intake manifold pressure (MAP) rapidly while transitioning into HCCI operation or decreases intake manifold pressure (MAP) rapidly while transitioning into SI operation. During these periods of high MAP and the resultant excess airflow, spark timing is retarded in order to minimize an undesired torque increase.

The engine control system manages transitions between the SI and HCCI modes by retarding spark. The amount of spark retard maybe based on a ratio of measured and desired air per cylinder (APC) or measured and desired engine torque representing values (ETRV). Ignition timing may be retarded when measured ETRV value is greater than a desired ETRV value. Ignition timing may be retarded when measured APC value is greater than a desired APC value.

For example only, the ETRV may be based on indicated mean effective pressure (IMEP), net mean effective pressure (NMEP), measured engine torque and/or any other suitable engine torque representing values.

Referring now to FIG. 1A, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by cutting off fuel and spark and/or disabling their exhaust and/or intake valves such that they remain closed, which prevents airflow into or out of the cylinder.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. Additionally, the amount of valve lift may be adjusted hydraulically or using other methods. A lift state module 159 controls a lift state of the intake and/or exhaust valves between the high and low lift states.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The ECM 114 may calculate measured air per cylinder (APC) based on the MAF signal generated by the MAF sensor 186. The ECM 114 may estimate desired APC based on engine operating conditions, operator input or other parameters. The ECM 114 may measure ETRV of the cylinders using a cylinder pressure sensor or a torque sensor 199. The ECM 114 may generate a desired ETRV based on engine operating conditions, operator input or other parameters. Measured and/or desired APC and/or ETRV may also be generated based on models.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance. Other actuators include the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

Measured APC values may be based on MAF values generated by the MAF sensor. The MAF value may be converted to cylinder airflow. ETRV is a measurement of the useful pressure or work produced by combustion and may be measured directly using pressure sensors in the cylinders or torque sensors 199 in the cylinders. Alternately, the APC and ETRV can be modeled.

Figure 1B:
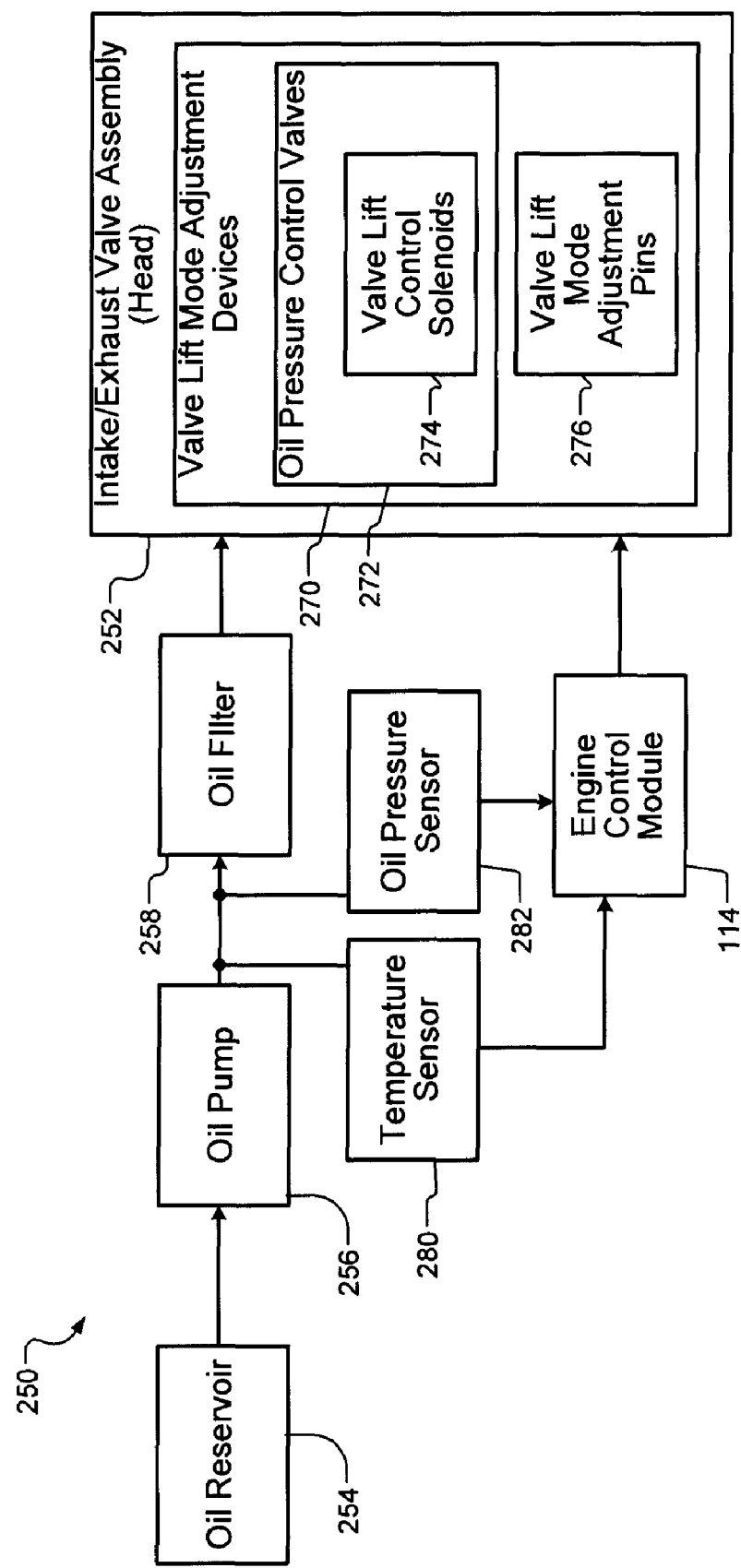
FIG. 1B is a functional block diagram of an exemplary valve lift control systems.

Referring now to FIG. 1B, a functional block diagram of an exemplary valve lift control circuit 250 is shown. Any valve lift control system may be used. The valve lift control circuit 250 includes an intake/exhaust valve assembly 252 that receives oil from an oil reservoir 254 via an oil pump 256. The oil is filtered through an oil filter 258 prior to reception by the valve assembly 252. The control module controls lift operation of intake and exhaust valves of the valve assembly 252.

The valve assembly 252 includes the intake and exhaust valves. A dedicated intake camshaft and a dedicated exhaust camshaft may be included. In another embodiment, the intake and exhaust valves share a common camshaft. When in an open state the intake and exhaust valves may be operating in various lift states.

The valve assembly 252 also includes valve lift state adjustment devices 270. The lift state adjustment devices 270 may include oil pressure control valves 272 and valve lift control valves, such as solenoids 274. Other lift state adjustment devices 276, such as lift pins, levers, rockers, springs, locking mechanisms, tappets, etc may be included.

The valve lift control circuit 250 may include an oil temperature sensor 280 and/or an oil pressure sensor 282. The control module signals the oil pressure control valves 272 based on temperature and pressure signals received from the temperature and pressure sensors 280, 282.

Figure 2:
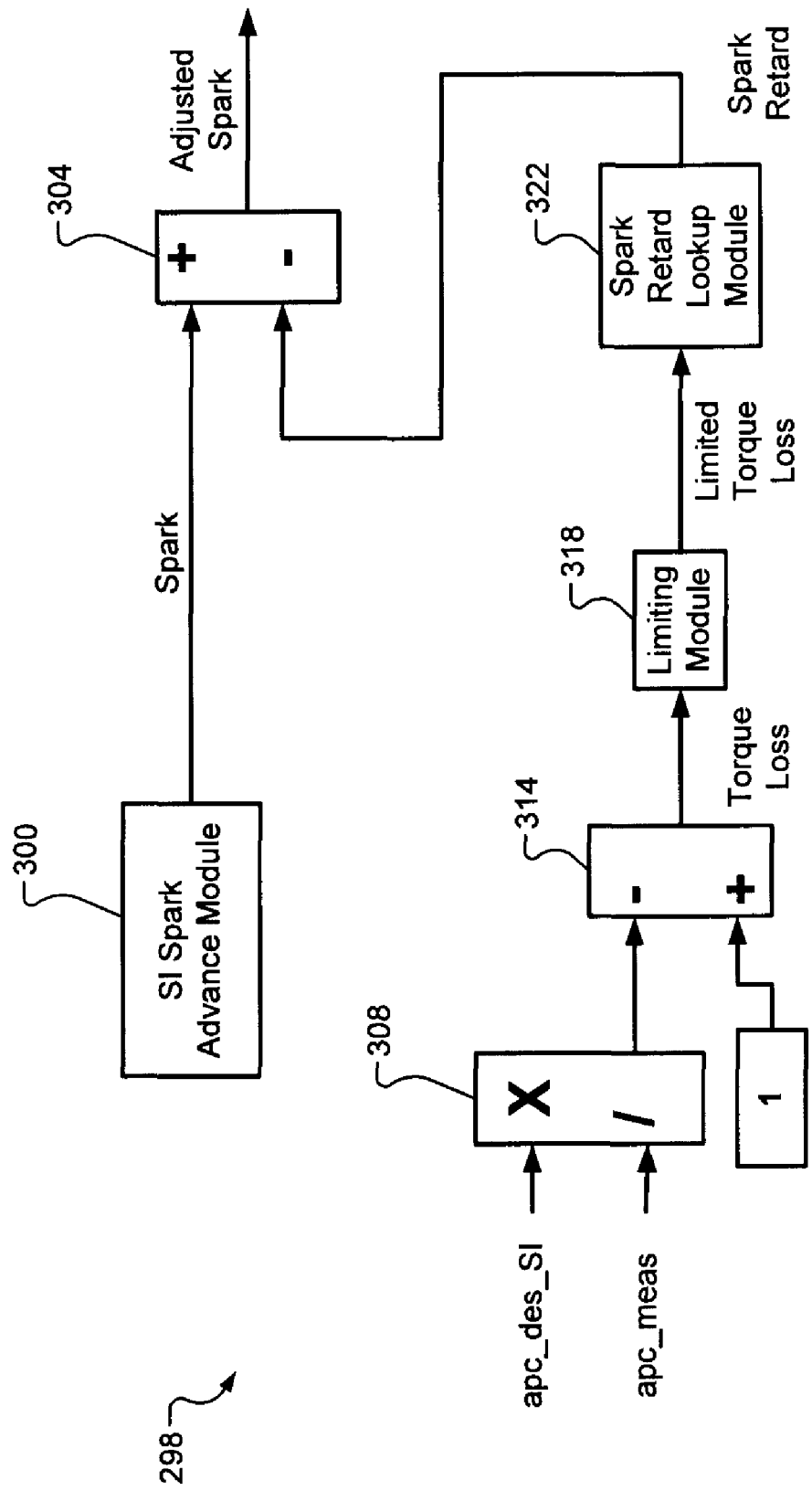
FIGS. 2 and 3 are functional block diagrams of exemplary spark retard calculating modules.
Figure 3:
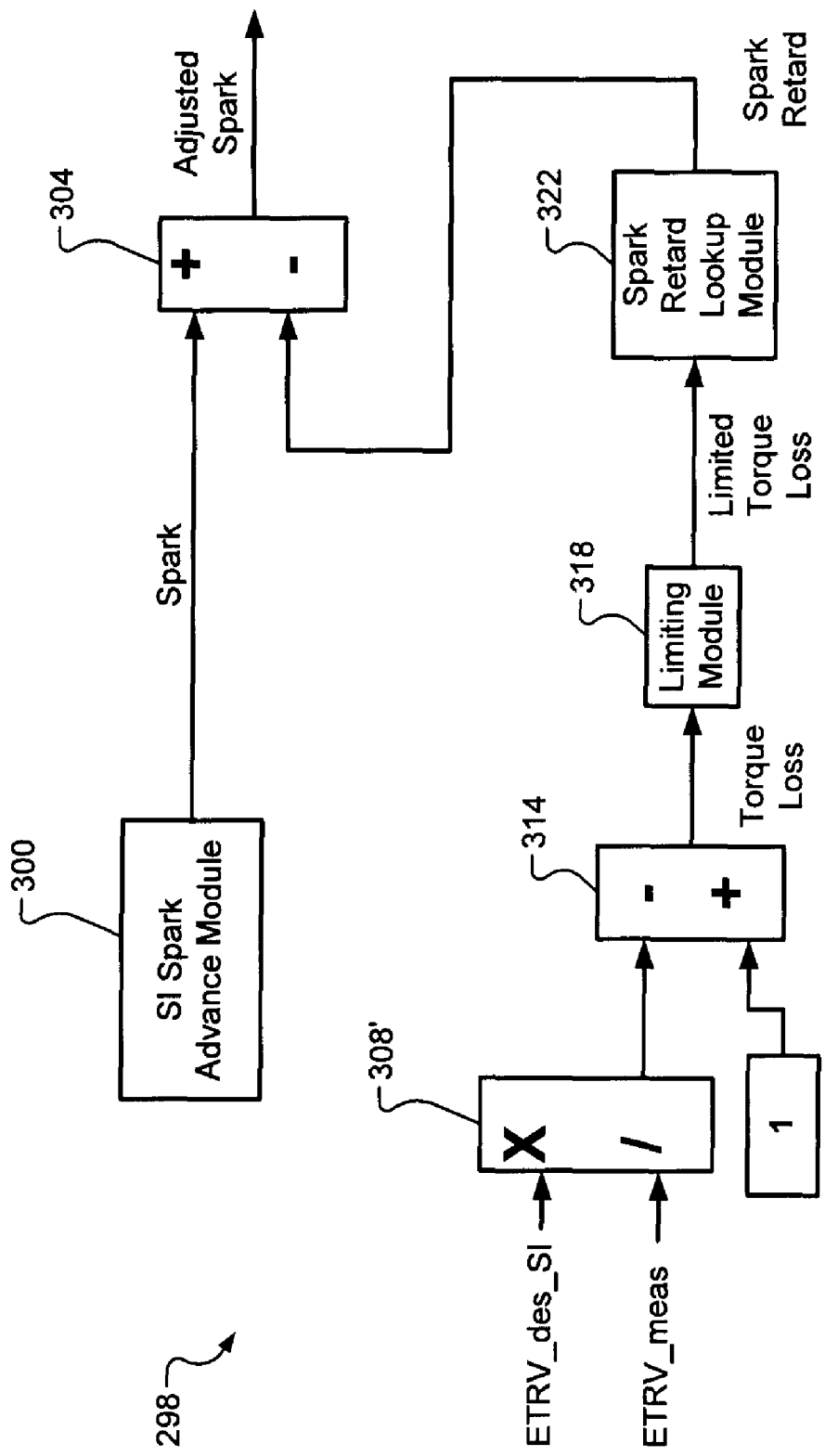

Referring now to FIGS. 2 and 3, a spark adjusting module 298 may include an SI spark advance module 300 that generates a spark ignition (SI) spark value and outputs the SI spark value to a summing module 304. In FIG. 2, a ratio generating module 308 generates the ratio based upon measured and desired air per cylinder ($APC_{meas}$) and $APC_{des\_SI}$, respectively. In FIG. 3, the ratio generating module 308' generates a ratio based upon measured and desired ETRV ($ETRV_{meas}$) and ($ETRV_{des\_SI}$), respectively.

A summing module 314 generates a difference (representing torque loss value) between a constant value such as 1 and the output of the ratio generating module 308. A limiting module 318 limits the output of a summing module 314 between first and second values (representing a limited torque loss value). For example only, the limiting module 318 may limit the torque loss value of the summing module 314 between 0 and 0.75 (or 0% and 75%). A spark retard lookup table 322 generates a spark retard value based upon the limited torque loss value. The spark retard value may be subtracted from the SI spark value generated by the SI spark advance module 300 by the summing module 304.

Figure 4:
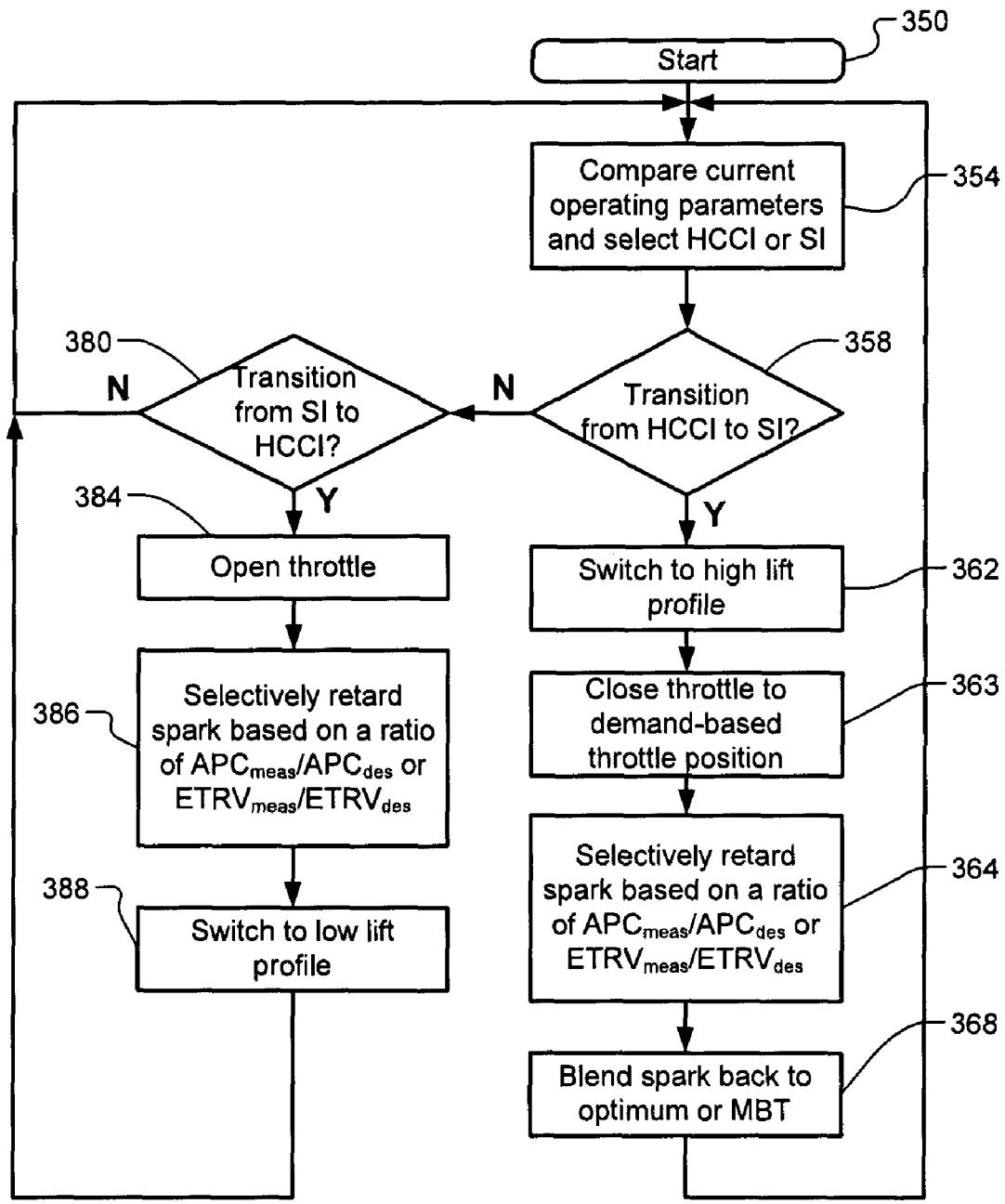
FIG. 4 illustrates steps of a method for operating the engine control system.

Referring now to FIG. 4, control begins with step 350. In step 354, control selects either the HCCI mode or the SI mode based upon current engine operating parameters such as engine speed, load, etc. In step 358, control determines whether a transition from HCCI to SI is required. If step 358 is true, control switches the intake and exhaust lift profile to the high lift profile in step 362, which increases the charge of air. In step 363, control controls or blends the throttle back to the demand-based throttle position. As a result, torque output increases.

In step 364, control selectively retards spark based on either the APC-based ratio or the ETRV-based ratio. Ignition timing may be retarded when measured ETRV value is greater than a desired ETRV value. Ignition timing may be retarded when measured APC value is greater than a desired APC value. In step 368, control blends spark back to desired, optimum or mean best torque (MBT) values. Control continues from step 368 to step 354.

If step 358 is false, control determines whether a transition from the SI mode to the HCCI mode is required. If step 380 is true, the throttle is controlled in step 384. When opened, torque will increase by increasing the charge of air. As a result, torque output increases. In step 386, control retards spark based on the APC-based ratio or the ETRV-based ratio to maintain a desired torque. In step 388, control switches to the low lift intake and exhaust profile. Control continues from step 388 to step 354.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for an engine, comprising:
   an air per cylinder (APC) generating module that generates measured and desired APC values;
   a combustion transition module that selectively transitions the engine from spark ignition (SI) combustion to homogeneous charge compression ignition (HCCI) combustion and from HCCI combustion to SI combustion; and
   a spark control module that selectively retards spark during said transitions based on a ratio of said measured APC value and said desired APC value.

2. The control system of claim 1 wherein said spark control module retards said spark when said measured APC value is greater than said desired APC value.

3. The control system of claim 1 further comprising a lift adjustment module that employs a first intake and exhaust lift state during said HCCI combustion and a second intake and exhaust lift state during said SI combustion.

4. The control system of claim 3 wherein, when transitioning from said HCCI combustion to said SI combustion, said lift adjustment module switches to said second intake and exhaust lift state and said spark control module retards said spark.

5. The control system of claim 4 wherein said spark control module blends said spark during said transitions until returning to a mean best torque (MBT) value and further comprising a throttle control module that controls a throttle of the engine to a demand-based throttle position.

6. The control system of claim 4 further comprising a throttle control module wherein, when transitioning from said SI combustion to said HCCI combustion, said throttle control module controls a throttle of the engine to a transition position, said spark control module retards said spark and said lift adjustment module switches to said first intake and exhaust lift state.

7. A method for controlling for an engine, comprising:
   generating measured and desired air per cylinder (APC) values;
   selectively transitioning the engine from spark ignition (SI) combustion to homogeneous charge compression ignition (HCCI) combustion and from HCCI combustion to SI combustion; and
   selectively retarding spark during transitioning based on a ratio of said measured APC value and said desired APC value.

8. The method of claim 7 further comprising retarding said spark when said measured APC value is greater than said desired APC value.

9. The method of claim 7 further comprising employing a first intake and exhaust lift state during said HCCI combustion and a second intake and exhaust lift state during said SI combustion.

10. The method of claim 9 further comprising:
    switching to said second intake and exhaust lift state; and
    retarding said spark when transitioning from said HCCI combustion to said SI combustion.

11. The method of claim 10 further comprising:
    blending said spark during transitioning until returning to a mean best torque (MBT) value; and
    controlling a throttle of the engine to a demand-based throttle position.

12. The method of claim 9 further comprising:
    controlling a throttle of the engine to a transition position;
    retarding said spark; and
    switching to said first intake and exhaust lift state when transitioning from said SI combustion to said HCCI combustion.

* * * * *